(12) United States Patent
Sano et al.

(10) Patent No.: US 6,724,443 B1
(45) Date of Patent: Apr. 20, 2004

(54) ACTIVE MATRIX TYPE DISPLAY DEVICE

(75) Inventors: Keiichi Sano, Anpachi-gun (JP); Norio Nakatani, Hashima (JP); Hiroshi Matsuda, Gifu (JP); Ryoichi Yokoyama, Ohgaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/527,925

(22) Filed: Mar. 17, 2000

(30) Foreign Application Priority Data

| Mar. 18, 1999 | (JP) | 11-073929 |
| Mar. 30, 1999 | (JP) | 11-089248 |
| Oct. 27, 1999 | (JP) | 11-305806 |

(51) Int. Cl.⁷ .......................................... G02F 1/1343
(52) U.S. Cl. ........................................ 349/39; 349/38
(58) Field of Search ............................ 349/38, 39, 42, 349/43

(56) References Cited

U.S. PATENT DOCUMENTS

| 5,608,556 A | 3/1997 | Koma | 349/143 |
| 5,666,179 A | 9/1997 | Koma | 349/143 |
| 5,710,611 A | 1/1998 | Suzuki et al. | 349/129 |
| 5,907,380 A | 5/1999 | Lien | 349/141 |
| 5,986,723 A * | 11/1999 | Nakamura et al. | 349/39 |
| 6,097,466 A | 8/2000 | Koma | 349/143 |
| 6,157,428 A | 12/2000 | Koma | 349/138 |
| 6,278,503 B1 | 8/2001 | Nishikawa et al. | 349/39 |
| 6,362,864 B2 | 3/2002 | Koma et al. | 349/138 |
| 6,369,870 B1 | 4/2002 | Koma | 349/130 |
| 6,456,352 B1 | 9/2002 | Matsuyama et al. | 349/143 |

FOREIGN PATENT DOCUMENTS

| JP | 02234127 | 9/1990 |
| JP | 7311383 A | 11/1995 |
| JP | 09043610 | 2/1997 |

* cited by examiner

Primary Examiner—Dung Nguyen
(74) Attorney, Agent, or Firm—Hogan & Hartson LLP

(57) ABSTRACT

A pair of storage capacitor electrodes are extended along a data line to provide storage capacitance along the data line. One of the storage capacitor electrodes is a metal electrode which partially overlaps the data line. Light can thereby be shielded in a region between the data line and a pixel electrode while forming a storage capacitor. The other storage capacitor electrode is positioned so as to avoid overlapping the data line, thereby suppressing coupling between the data line and the other storage capacitor electrode.

18 Claims, 9 Drawing Sheets

ACTIVE MATRIX TYPE DISPLAY DEVICE

BACKGROUND OF THE INVENTION

1. Field of the Invention

The present invention relates to a liquid crystal display (LCD), and more particularly to an active matrix type display device employing a thin film transistor (TFT) with a structure conducive to size reduction of the display device.

2. Description of the Related Art

An LCD is a display device configured by sandwiching liquid crystal between opposing first and second substrates. Typically, arranged on the first substrate are TFTs serving as switching elements and pixel electrodes formed for each pixel. A counter electrode is disposed on the second substrate. FIG. 1 is a plan view showing a first substrate of a conventional active matrix type LCD. A plurality of data lines 51 extend parallel to one another in the column direction, while a plurality of parallel gate lines 52 extending in the row direction intersect the data lines 51. A TFT 53 and a pixel electrode 54 are provided corresponding to each intersection of a data signal (drain signal) line 51 and a gate signal line 52. FIG. 1 illustrates a delta arrangement in which adjacent rows are arranged shifted from one another in the row direction.

Each TFT 53 includes a semiconductor film 62 connected to a data signal line 51 via a contact 61. This semiconductor film 62 further connects to a pixel electrode 54 via another contact 63. The semiconductor film 62 intersects a gate line 52 in two locations, forming gates 64, 65, respectively.

When a predetermined voltage is applied to the gate signal line 52, a channel is formed at the gates 64, 65 of the semiconductor film 62 of the TFT 53, turning on the TFT. The data voltage applied to the data signal line 51 is then applied to the pixel electrode 54. The electric field thus generated drives the liquid crystal to indicate display according to the data voltage.

In the present specification, a TFT structure including two gates as described above is referred to as a double gate. When a double gate is adopted in the TFT 53, TFTs having high resistances are connected in series. With this arrangement, it is possible to reduce undesired current that inadvertently leaks and flows when the TFTs are turned off, namely, the off-leak current.

Each semiconductor film 62 includes a capacitor region 62a overlapping the pixel electrode 54. Overlapping a large region of the capacitor regions 62a located over the pixel electrode 54, a storage capacitor electrode 55 extends along the row direction. The storage capacitor electrode 55 is formed in the same layer as the gate signal line 52. Together with the capacitor regions 62a of each semiconductor region 62a, the storage capacitor electrode 55 forms a storage capacitor for retaining a voltage applied to each pixel electrode 54.

On the second substrate opposing the first substrate having the above-described structure, components such as a counter electrode and a black matrix are formed. The counter electrode is formed on the entire surface so as to oppose the plurality of pixel electrodes. The black matrix is a light-shielding film formed in regions opposing the data lines 51 and the TFTs 53 to prevent light leakage from regions between the data signal lines 51 and the pixel electrodes 54, or to prevent flow of leak current generated when light irradiates on the TFTs 53. The black matrix is formed to be approximately 6 μm wider than the data signal lines 51 so that light leakage is prevented even when a slight alignment error exists between the two substrates. To simplify the drawing of FIG. 1, the actual black matrix is not drawn, but its width is indicated by BM.

The cross-sectional view along line A–A' of FIG. 1 is shown in FIG. 2. The storage capacitor electrode 55 is arranged on a glass substrate 71. The semiconductor film 62 of the TFT 53 is disposed on the storage capacitor electrode 55, with a first gate insulating film 72 formed between the semiconductor film 62 and the storage capacitor electrode 55. After providing an interlayer insulating film 73 on the semiconductor film 62, a data line 51 is arranged. A planarizing film 74 and the pixel electrode 54 are sequentially formed. An orientation film 75 is then formed covering a plurality of pixel electrodes 54. Provided further on top are liquid crystal and a counter substrate, neither of which is shown. The data signal line 51 and the pixel electrode 54 are spaced apart by a predetermined distance d so as to minimize parasitic capacitance. The distance d may be, for example, approximately 1 μm. The black matrix is formed spanning between the pixel electrode 54 and an adjacent pixel electrode 54 in order to prevent light leakage from the gap between d.

In recent years, it has been common to find active matrix type display devices employed as displays on portable electronic instruments, such as the view finders of digital still and digital video cameras. When mounting active matrix type display devices on portable instruments, there exist a need to accomplish size reduction of such devices in which the display screen size is reduced while maintaining the number of pixels.

The capacitance of the storage capacitor is proportional to the area in which the storage capacitor electrode 55 and the semiconductor film 62 overlap. In reducing the display screen size while maintaining the number of pixels, if size reduction is performed according to simple similitude, the capacitance of the storage capacitor becomes insufficiently small along with the reduction. It would therefore be impossible to appropriately retain the voltage applied to the pixel electrode 54.

If the pixel size is reduced to maintain sufficient capacitance of the storage capacitor, the ratio of the area of the storage capacitor electrode 55 within one pixel proportionally increases. The region in which the storage capacitor electrode 55 is formed does not allow light transmission, as the storage capacitor electrode 55 providing the storage capacitance is composed of a metal film such as of chromium. Accordingly, decrease in the aperture ratio in pixels cannot be avoided when maintaining a fixed area of storage capacitor when the pixel size is reduced.

SUMMARY OF THE INVENTION

The purpose of the present invention is to provide a display device having a high aperture ratio while maintaining sufficient area for storage capacitance. Another purpose is to obtain a display device which suppresses coupling between the data lines and the semiconductor films constituting the capacitor electrodes.

According to the present invention, a storage capacitor is provided along a data line. Sufficient storage capacitance can thereby be provided while maintaining high aperture ratio. Using an electrode (a second storage capacitor electrode) for creating a storage capacitor, light can be shielded in a region between the data line and a pixel electrode while forming a storage capacitor. Further, by widening the data line to form a light-shielding portion, light leakage from a region between an end of the storage capacitor electrode and a gate signal line can be prevented.

Coupling between the data line and the first storage capacitor electrode can be suppressed by positioning the first storage capacitor electrode so as to avoid overlapping the data line. Further, coupling between the data line and the first storage capacitor electrode can also be minimized by providing a shielding film between the data line and the first storage capacitor electrode when forming the storage capacitor under the data line.

Formation of the first storage capacitor electrode can be facilitated by extending the semiconductor film that constitute the active layer of a transistor, and using the extended portion as the first storage capacitor electrode.

DESCRIPTION OF THE PREFERRED EMBODIMENTS

Figure 1:
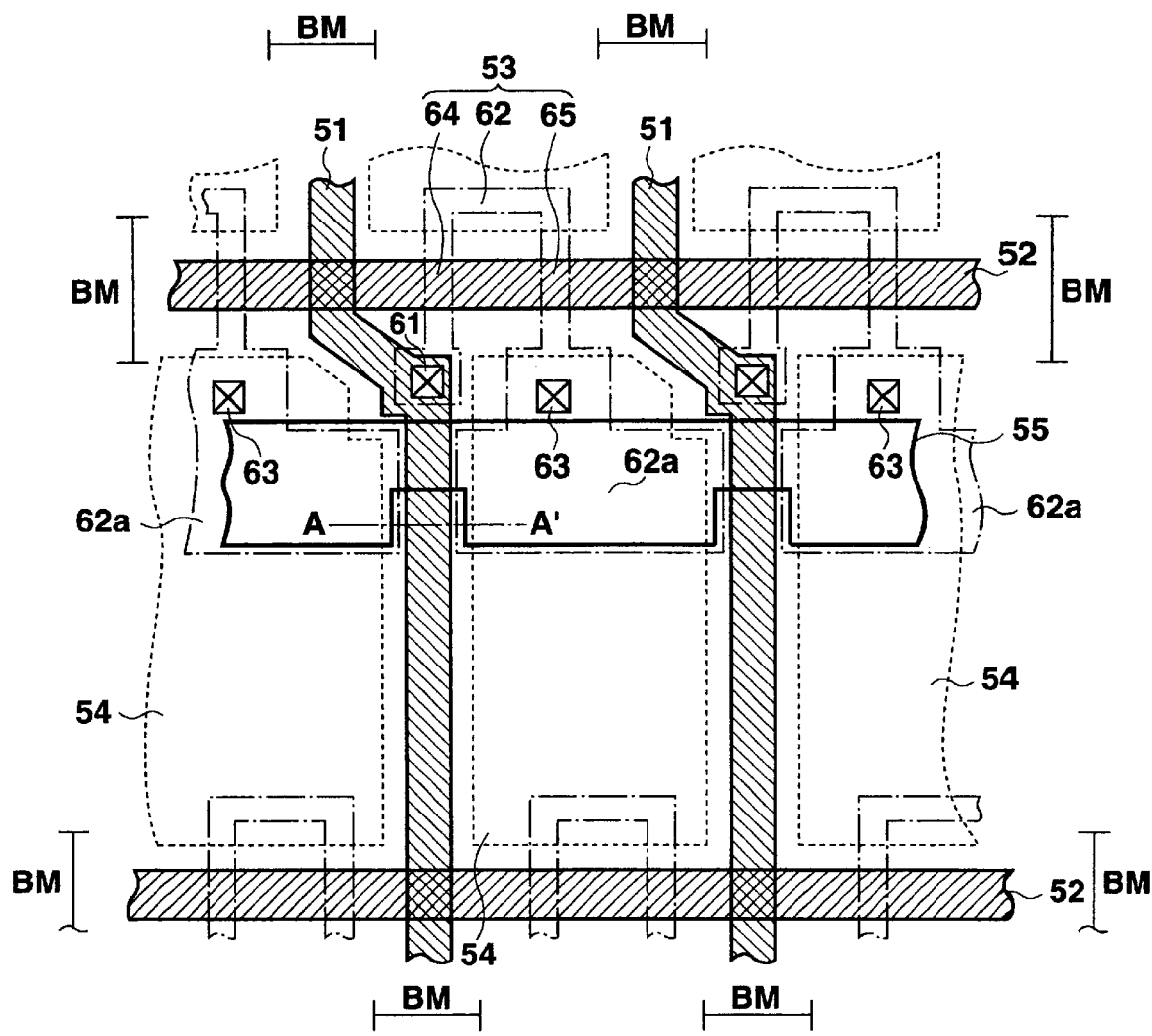
FIG. 1 is a plan view of a conventional display device.
Figure 2:
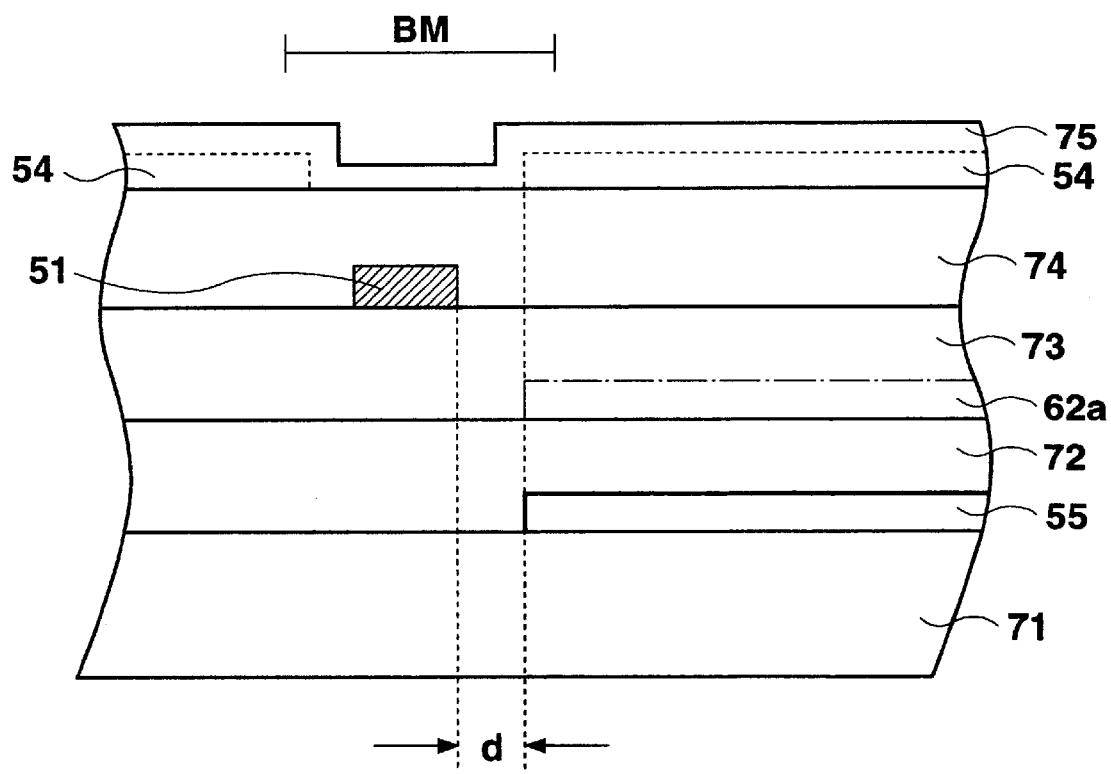
FIG. 2 is a cross-sectional view of the conventional display device.
Figure 3:
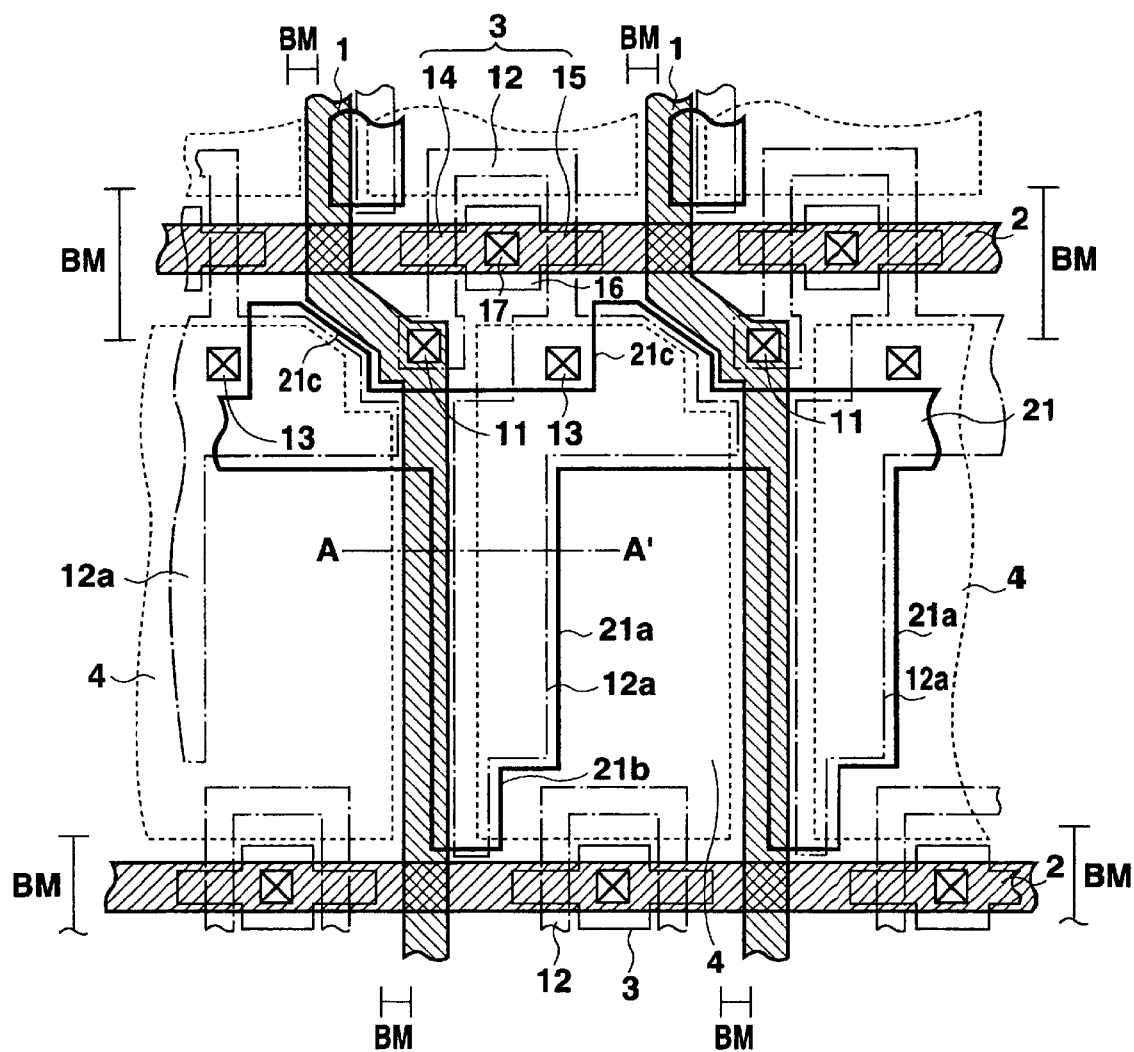
FIG. 3 is a plan view of a display device according to a first embodiment of the present invention.

FIG. 3 is a plan view of a display device according to a first embodiment of the present invention. A plurality of data lines 1 extend in parallel to one another in the column direction, while a plurality of gate lines 2 extend in parallel to one another in the row direction, intersecting the data lines 1. A TFT 3 and a pixel electrode 4 are provided corresponding to each intersection of data signal lines 1 and gate signal lines 2.

The gate signal lines 2 and capacitor electrodes 21 are disposed on a first substrate. After forming an insulating film, semiconductor films 12 are subsequently disposed. The data signal lines 1 are arranged on the semiconductor films 12 after forming another insulating film. Each data line 1 is connected to the semiconductor film 12 of a TFT 3 via a contact 11. The semiconductor film 12 is further connected to a pixel electrode 4 via another contact 13. The TFT 3 intersects a gate line 2 in two locations to form gates 14, 15, respectively, thereby providing the so-called double gate structure. Furthermore, a gate electrode 16 is disposed in a layer on the opposite side of the semiconductor film 12 away from the gate line 2. The gate electrode 16 is connected to the gate line 2 via a contact 17, forming the so-called dual gate structure.

The above-described points are similar to a conventional LCD. The feature of the present embodiment resides in the shape of the storage capacitor electrode 21 indicated by a thick solid line, and in the shape of the capacitor region 12a of the TFT 3 indicated by a single-dot broken line. The storage capacitor electrodes 21 are formed in the same layer as the gate lines 2, and composed of a metal such as chromium. The storage capacitor electrodes 21 are connected to one another along the row direction. Each storage capacitor electrode 21 has a protruding portion 21a extending in the column direction along a data line 1 in a region overlapping a pixel electrode 4 indicated by dotted lines. Similarly, the capacitor region 12a of the semiconductor film 12 also includes a protruding portion 12a extending in the column direction along the data line 1. The protruding portion 12a is continuously formed with the portion constituting the TFT 3, and is shaped corresponding to the shape of the storage capacitor electrode 21 and its protruding portion 21a.

The tip 21b of the protruding portion 12a forming the storage capacitor is indented so as to prevent short-circuiting with the semiconductor film 12 and its capacitor region 12a of the TFT 3 in the next row. The storage electrode 21 is similarly shaped in accordance with the capacitor region 12a.

Formation of the storage capacitor electrode 21 in the manner of the present embodiment allows sufficient area to be secured for the storage capacitor electrode while minimizing decrease in the aperture ratio. The portions along the data signal line 1 are the regions in which the black matrix is typically provided on the counter substrate, and light is shielded in any event. In addition, the black matrix is formed wider than the data signal line 1 to provide margins for substrate misalignment. Accordingly, light-shielding components can be accumulated under one same region by forming the storage capacitor electrode 21 along the data signal line 1, thereby minimizing decrease in the aperture ratio.

The storage capacitor electrode 21 and the capacitor region 12a further include protruding portions 21c formed along the bend of the data line 1 in the upper portion of the figure. Protruding portions 21c are similarly formed in a light-shielded region wherein the black matrix is provided to shield light from the TFT 3, as indicated by BM. The black matrix is disposed in a region above each TFT 3 because operation errors may be caused when light irradiates the TFT 3. By overlapping protruding portions 21c with the black matrix, the area for capacitance is increased without any further decrease in the aperture ratio.

Figure 4:
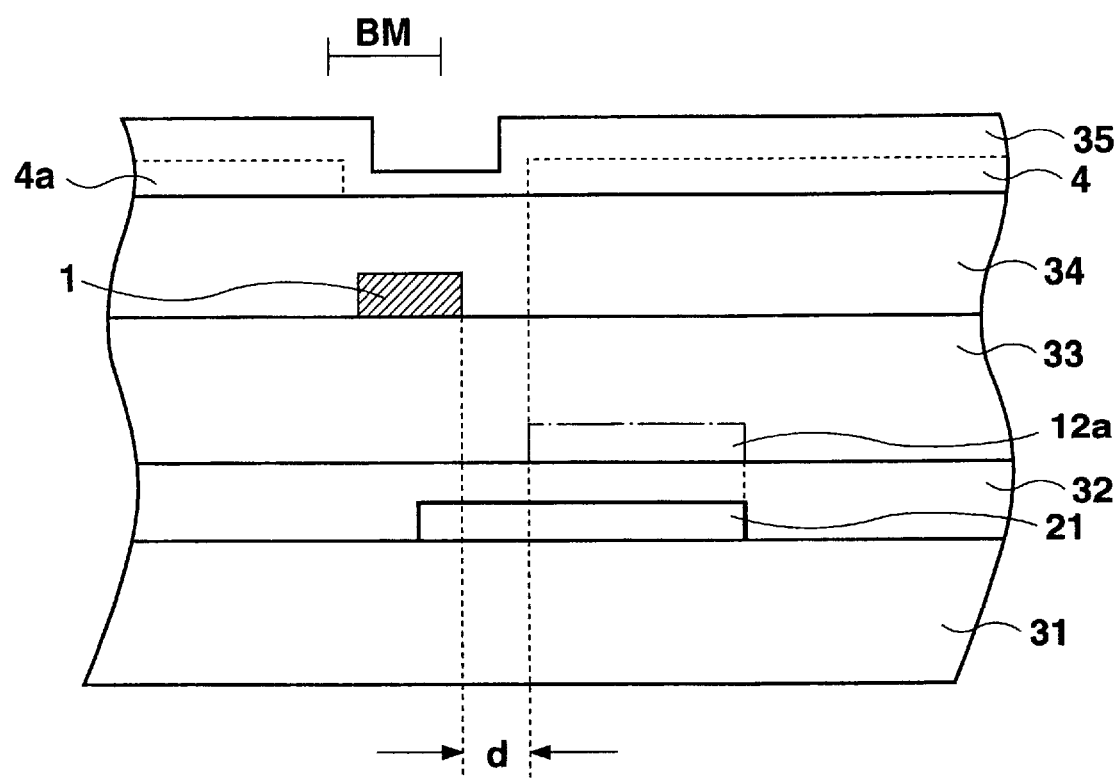
FIG. 4 is a cross-sectional view of the display device according to the first embodiment of the present invention.

FIG. 4 shows a cross-sectional view taken along line A–A' in FIG. 3. The storage capacitor electrode 21 is formed on the first substrate 31. After covering the storage capacitor electrode 21 with an insulating film 32, the capacitor region 12a of the semiconductor film 12 is formed. Subsequently, another insulating film 33 and the data signal line 1 are disposed. A planarizing insulating film 34, the pixel electrode 4, and the orientation film are then sequentially formed.

When an overlapping area between the data signal line 1 and the pixel electrode 4 is enlarged, the capacitance of this region is increased, which in turn decreases the response speed of the LCD. The data signal line 1 and the pixel electrode 4 are therefore spaced apart by a predetermined distance d. The black matrix described in the above Description of the Related Art was formed along the data line because it was necessary to shield light leaking from the space between the data signal line 1 and the pixel electrode 4. In the present embodiment, the storage capacitor electrode 21 is formed extending to the region under the data signal line 1, overlapping the data signal line 1. Therefore, no light leaks from the right side of the data signal line 1 in the figure. Accordingly, it is no longer necessary to dispose the black matrix BM in the region around the data signal line 1 in which the storage capacitor electrode 21 is disposed, and the black matrix needs only be arranged on the side of the adjacent pixel electrode 4a. Although the black matrix is not illustrated in the figure because it is formed on the counter substrate, the black matrix is arranged on the counter substrate in the region indicated by BM in the figure.

It is preferable that the storage capacitor electrode 21 and the data signal line 1 are spaced apart in the direction of substrate thickness by 0.5 µm or more. In the present embodiment, the storage capacitor electrode 21 and the data signal line 1 are spaced apart in the thickness direction by approximately 0.7 µm. The capacitance generated between the storage capacitor electrode 21 and the data signal line 1 is therefore small. Further, as a predetermined voltage is continuously applied to the storage capacitor electrode 21, "blunting" of the signal due to the capacitance generated between the storage capacitor electrode 21 and the data signal line 1 can be minimized. In the present embodiment, insulating film 32 has a thickness of 0.1 µm, and insulating film 33 a thickness of 0.6 µm.

It is preferable that the capacitance between the data signal line 1 and the storage capacitor electrode 21 similarly be maintained as low as possible. The data signal line 1 and the storage capacitor electrode 21 should therefore overlap one another by only a width corresponding to a possible manufacturing error such as mask misalignment. By providing the overlap by at least the width corresponding to the possible manufacturing error, no light will leak between the data signal line 1 and the storage capacitor electrode 21 even when a mask misalignment exists. When the overlapping width is made larger than a margin for the possible manufacturing error, it would simply undesirably increase the capacitance between the data signal line 1 and the storage capacitor electrode 21. The overlap width should therefore be approximately equal to the margin for the possible manufacturing error. The specific value of the overlap width depends on the manufacturing tolerance, but it would typically be sufficient to provide an overlap of approximately 1 µm to 3 µm. In the present embodiment, the overlap width is 2 µm.

Figure 5:
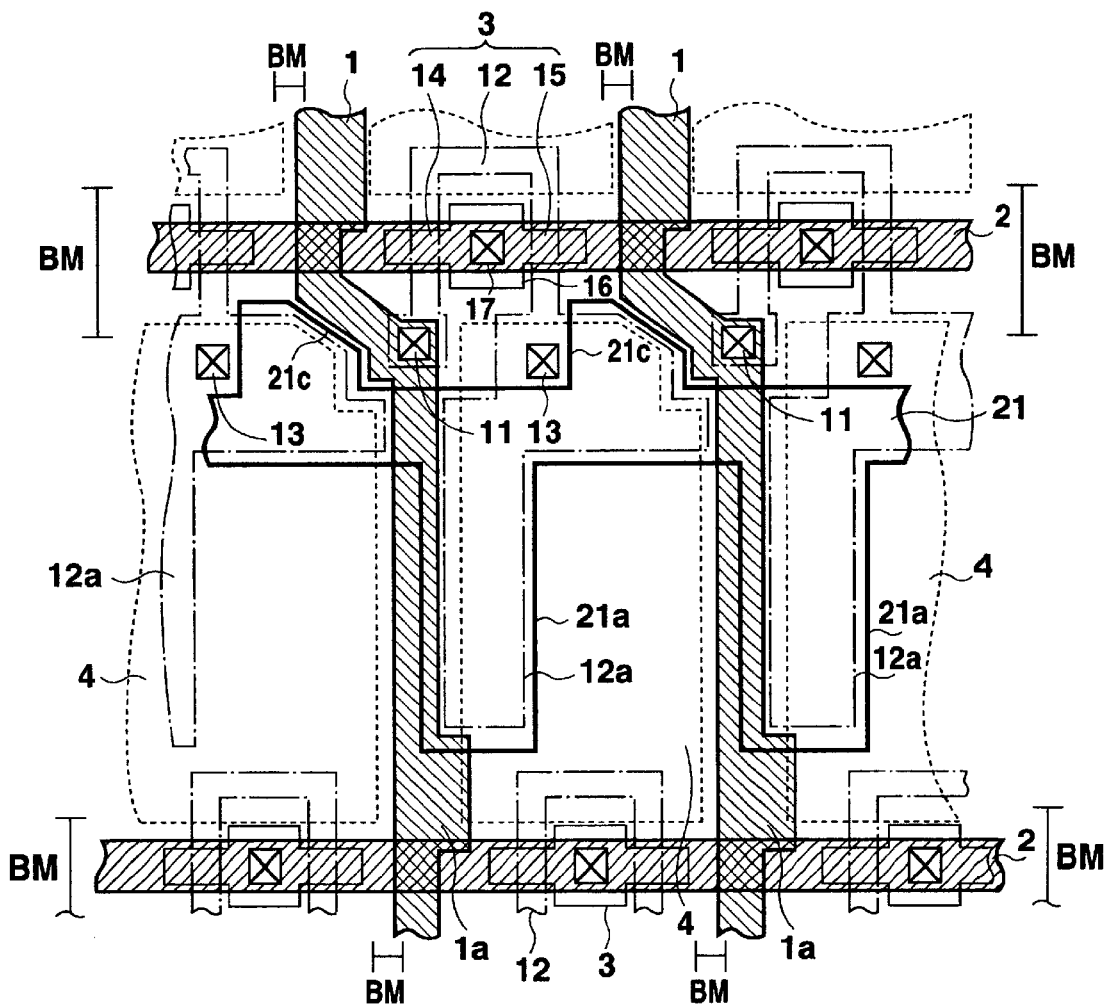
FIG. 5 is a plan view of a display device according to a second embodiment of the present invention.

FIG. 5 is a plan view showing a second embodiment of the present invention. Components corresponding to those in the first embodiment are labeled with corresponding numerals, and the explanation for those components will not be repeated. An additional feature of the second embodiment is that a light-shielding portion 1a is provided by widening the data signal line 1. The protruding portion 21a of the storage capacitor electrode 21 must be formed so as to be spaced apart from the gate line 2 by a predetermined distance because the storage capacitor electrode 21 is typically formed in the same layer as the gate line 2. As in the first embodiment, the black matrix is absent in the region corresponding to the side of the data line 1 in which the storage capacitor electrode 21 is located. Light leakage may therefore occur from the gap between the protruding portion 21a of the storage capacitor electrode 21 and the gate line 2. Although a black matrix may be provided in this region, such a black matrix must be disposed to cover an area larger than the actual required region in consideration of substrate misalignment, as a black matrix is formed on the counter substrate. When forming the light-shielding portion 1a on the data signal line 1 as in the present embodiment, it is unnecessary to take into account such substrate misalignment. Accordingly, light leakage from the gap between the storage capacitor electrode 21 and the gate line 2 can be prevented using only the minimum required light-shielding portion 1a.

Although the above embodiments were described based on an LCD with TFTs having double gate and dual gate structures, the TFTs are not limited to those structures. For example, TFTs having single gate and single-layer gate structures may similarly be used.

Also, while the examples illustrating the above embodiments adopted a delta arrangement in which the pixel electrodes 4 are shifted away from one another by half a pixel in the row direction, the present invention is not limited to such an arrangement. A stripe arrangement in which the pixels are aligned in straight lines may similarly be used.

Furthermore, although the semiconductor film was employed to serve as one of the storage electrodes constituting the storage capacitor, the present invention is not limited to such a structure. A metal electrode may separately be provided instead.

As described above, according to the first and second embodiments, the capacitor electrode and the semiconductor film include protruding portions, respectively, extended along the data line. In this way, light-shielding components are accumulated under the same region, enhancing the pixel aperture ratio.

No light leakage occurs between the data line and the storage capacitor electrode because the protruding portion of the storage capacitor electrode is arranged to overlap at least a portion of the data line.

As the protruding portion of the semiconductor film is arranged without overlapping the data line, parasitic capacitance generated between the protruding portion of the semiconductor film and the data line can be minimized.

The light-shielding portion 1a is formed on the data line 1 in the region between the end of the protruding portion of the storage capacitor electrode and the gate line of the adjacent column. As this light-shielding portion 1a partially overlaps the gate line and the storage capacitor electrode, no light leakage occurs between the end of the protruding portion of the storage capacitor electrode and the gate line.

In a large-size display device in which each pixel is large, decrease in aperture ratio due to the black matrix and the storage capacitors does not cause a significant problem because the ratio of area in one pixel occupied by the storage capacitor and black matrix is relatively low compared to that of a small-size display device. Accordingly, the present invention is most effective when implemented in display devices having small pixels, such as display devices having 4-inch or smaller screens, such as 2-inch or 1.5-inch screens, and high-resolution display devices such as XGA type 4-inch and 6-inch displays. The present invention can, however, also be implemented in large-size displays to increase the aperture ratio.

Figure 6:
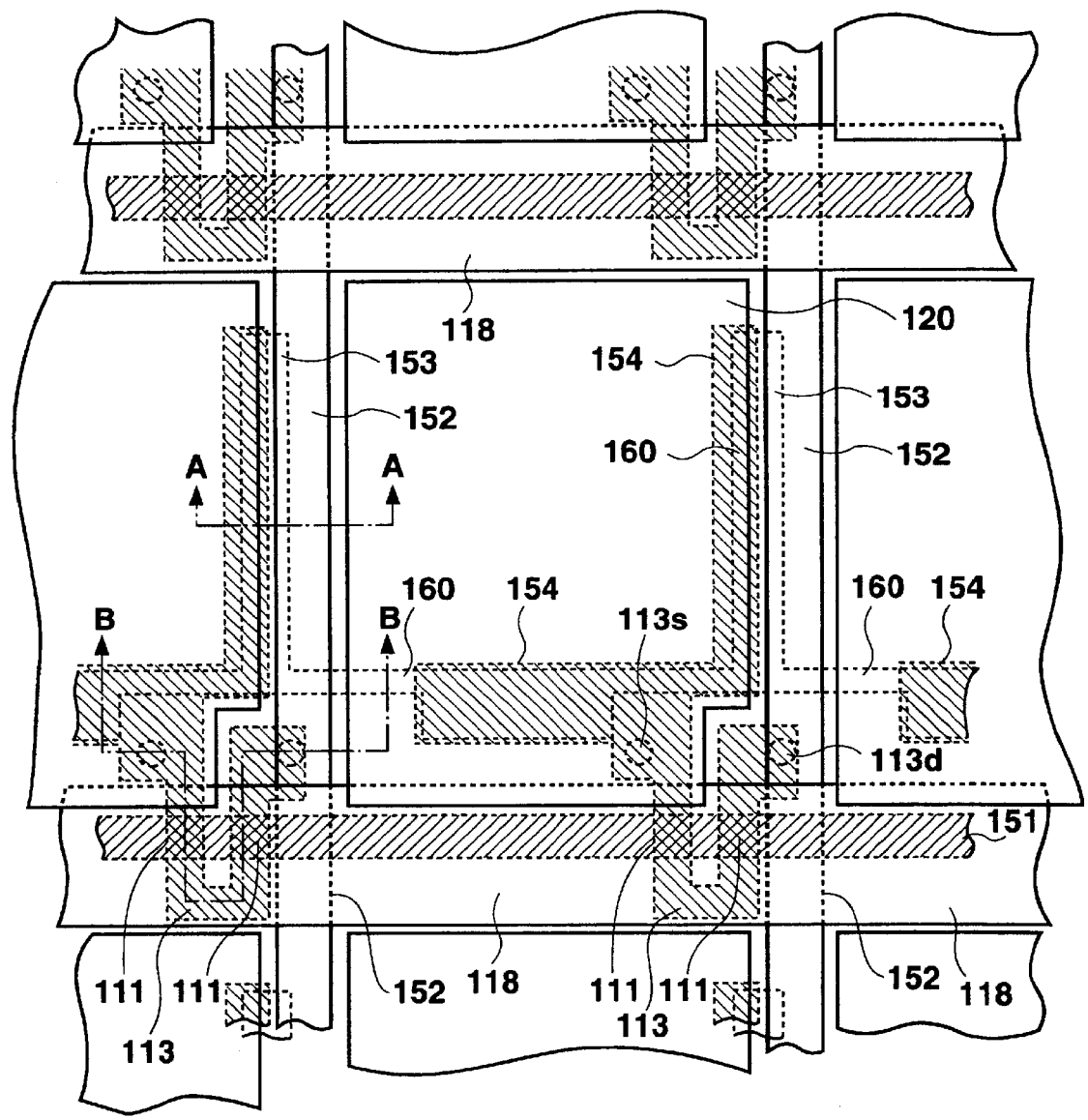
FIG. 6 is a plan view of a display device according to a third embodiment of the present invention.
Figure 7A:
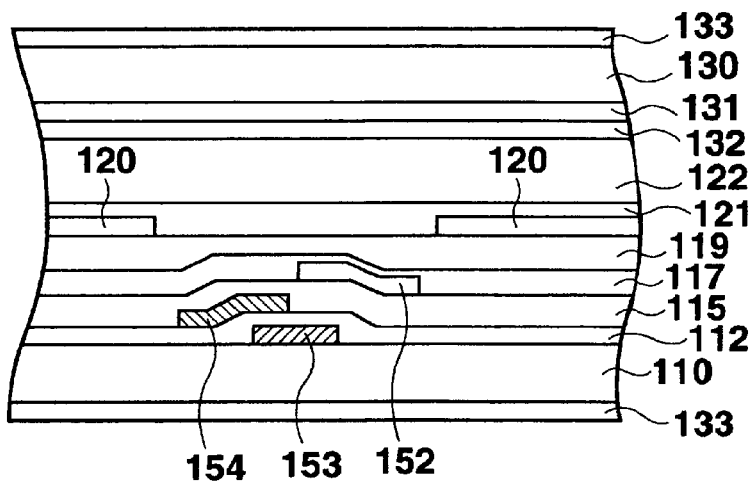
FIGS. 7A and 7B are cross-sectional views of the display device according to the third embodiment of the present invention.
Figure 7B:
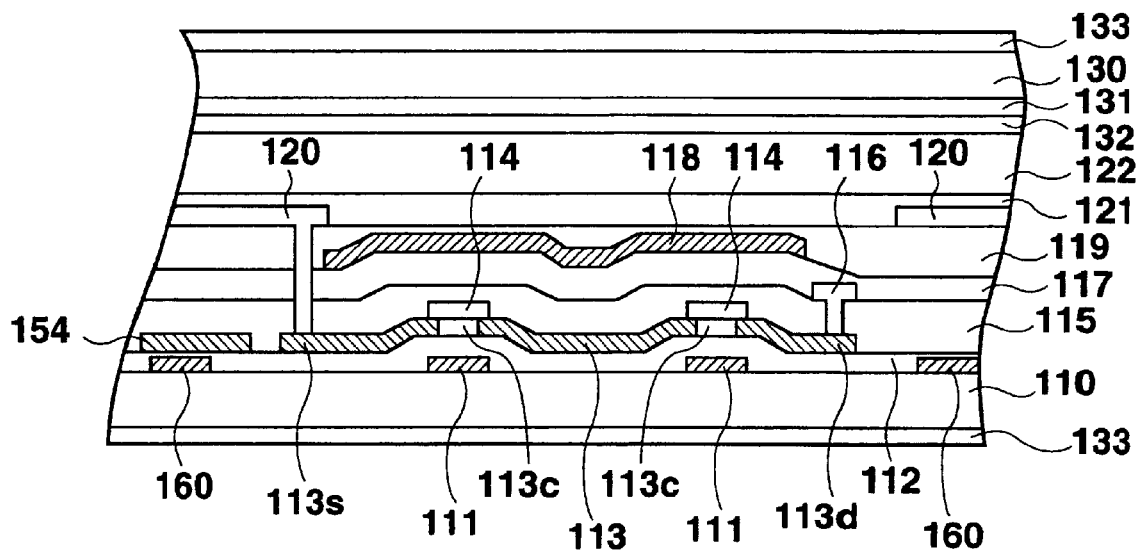

A third embodiment is next explained. This embodiment is also an example in which the present invention is implemented in an LCD. FIG. 6 is a plan view showing one pixel of an LCD. FIG. 7A shows a cross-sectional view taken along line A—A in FIG. 6, while FIG. 7B illustrates a cross-sectional view taken along line B—B in FIG. 6.

As shown in FIG. 6, a pixel electrode 120 that constitutes a display pixel is formed in each region surrounded by a plurality of gate signal line 151 and a plurality of data (drain) signal line 152. Each gate signal line 151 includes gate electrodes 111 in a portion thereof. The pixel electrode 120 is connected to a TFT.

A storage capacitor electrode line 160 extends over adjacent display pixels. The storage capacitor electrode line 160 is formed simultaneously with the gate electrodes 111, and is composed of a refractory metal such as Cr.

The storage capacitor electrode protruding portion 153 that perpendicularly protrudes from the storage capacitor electrode 160 extends along the data signal line 152 (along the vertical direction in the figure), and overlaps the data signal line 152.

As shown in FIG. 7B, the active layer 113 of the TFT, which is a semiconductor film, is composed of poly-silicon (p-Si) film (indicated by slanted lines sloping from the upper left to the lower right in the figure). The drain 113d provided in the active layer 113 is connected to the data signal line 152, while the source 113s is connected to the pixel electrode 120.

Channels 113c are formed in the portion of the active layer 113 located over the gate electrodes 111 and the gate insulating film 112. As the present embodiment adopts a double gate structure, two channel 113c are provided.

The source 113s is extended to overlap the entire storage capacitor electrode protruding portion 153, forming the capacitor electrode 154. In other words, a semiconductor film is extended to form the capacitor electrode 154. In this way, the capacitor electrode 154 and the storage capacitor electrode protruding portion 153 together create capacitance, with the gate insulating film 112 disposed in between. The capacitor electrode 154 is formed of p-Si film simultaneously with the formation of the active layer 113.

The first interlayer insulating film 115 is formed on the capacitor electrode 154, and the data signal line 152 made of a conductive material such as Al is subsequently disposed. After forming the second interlayer insulating film 117, a shielding film 118 is provided. A planarizing insulating film 119 composed of an organic resin for planarizing a surface is deposited over the shielding film 118, and the pixel electrode 120 made of ITO is then formed on top.

The structure of the LCD is further described with reference to FIGS. 7A and 7B.

As shown in FIG. 7B, provided on an insulator substrate composed of a material such as quartz glass and non-alkali glass are the gate signal lines 151 made of a refractory metal such as Cr and Mo, and the gate electrodes 111 constituting a part of each gate signal line. Over the gate electrodes 111, the gate insulating film 112, which is the first insulating film, and the active layer 113 composed of p-Si film are sequentially formed. The active layer 113 includes intrinsic or substantially intrinsic channels 113c formed above the gate electrodes 111. On the respective sides of the channels 113c, low-concentration regions, namely, the so-called LDD regions, are formed by performing ion doping while using the stopper insulating films 114 as masks. Furthermore, the source 113s and drain 113d are provided on both sides of the active layer by performing ion doping to create high-concentration regions. As shown in FIG. 7A, a capacitor for accumulating charges is configured between the storage capacitor electrode protruding portion 153 protruding from the storage capacitor electrode line 160, and the capacitor electrode 154 formed by extending the source 113s of the active layer 113. This capacitor is a storage capacitor for retaining the voltage applied to the liquid crystal 122. The storage capacitor electrode protruding portion 153 is formed at the same time with the gate electrode 111 and the gate signal lines 151.

An interlayer insulating film 115, which is the second insulating film, is formed on the entire surface over the gate insulating film 112, the active layer 113, and the stopper insulating films 114, by sequential lamination of a SiO$_2$ film, a SiN film, and a SiO$_2$ film, for example. A contact hole formed in the interlayer insulating film 115 in a position corresponding to the drain 113d is filled with metal such as Al, to thereby form the drain electrode 116. The data signal line 152 formed at the same time with the drain electrode 116 is arranged over the gate electrodes 11 and the protruding portion 153, as shown in FIG. 7A. Furthermore, another interlayer insulating film 117, which is the third insulating film, is formed on the entire surface by sequential lamination of a SiO$_2$ film, a SiN film, and a SiO$_2$ film, for example. Subsequently disposed on top is a shielding film 118 made of a non-transparent material that shields light such as a metal like Cr, Mo, or titanium (Ti).

Further, a planarizing insulating film 119 made of a material such as an organic resin is provided as the fourth insulating film and for planarizing the surface.

A contact hole is formed in the planarizing insulating film 119 and the interlayer insulating films 117,115 in a position corresponding to the source 113s. The pixel electrode 120 made of ITO that contacts the source 113s through this contact hole is formed on the planarizing insulating film 119. ITO is a transparent conductive material.

An orientation film 121 for orienting the liquid crystal 122 is provided over the pixel electrode 120 and the planarizing insulating film 119.

In this way, the TFT substrate 110 provided with TFTs is completed.

The counter electrode substrate 130 arranged opposing this TFT substrate 110 is provided with, in order from a position closest to the substrate 130, the counter electrode 131 composed of a transparent conductive material, and an orientation film 132 made of an organic resin or a similar material.

The two substrates 110,130 are arranged facing one another, and sealed by surrounding the substrates with a sealing adhesive. Liquid crystal 122 is filled in the gap between the two substrates. Subsequently, polarizers 133 are attached on the outboard of the two substrates to complete the LCD.

In the above-described structure, the storage capacitor electrode protruding portion 153 is arranged to overlap the capacitor electrode 154 while the gate insulating film 112 is interposed in between, so as to generate capacitance in the overlapped portion. Further, when the data signal line 152 is laminated in an overlying layer above the capacitor electrode 154 after disposing the interlayer isolating films 115 and 117, the capacitor electrode 154 and the data signal line 152 are arranged so as to avoid vertical overlap.

As the capacitor electrode 154 and the data signal line 152 do not form an overlap as described above, generation of capacitance coupling between the capacitor electrode 154 and the data signal line 152 is prevented. The voltage applied to the capacitor electrode 154 can therefore be retained as it is without being altered by the influence of the voltage applied to the data signal line 152 which is varied for every horizontal synchronization period.

In this way, the voltage applied to the pixel electrode 120 is prevented from being altered, avoiding diminishing of the retained voltage, namely, the effective voltage applied to the liquid crystal 122. As a result, the conventional problem of whitish screen and the resulting decrease in contrast can be eliminated.

The data signal line 152 must at least not overlap the semiconductor film constituting the capacitor electrode 154. The entire data signal line 152 need not overlap the storage capacitor electrode protruding portion 153, but, when the overlapped portion between the data signal line 152 and the protruding portion 153 is reduced, the area for the pixel electrode 119 may become smaller, thereby decreasing the aperture ratio. In addition, when the overlapped portion does not exist, light leakage may occur from the gap between the data signal line 152 and the protruding portion 153. Accordingly, the overlapping area between the data signal line 152 and the protruding portion 153 may be determined within the range allowing maximum aperture ratio.

While p-Si film was used as the semiconductor film of the active layer in the above embodiment, micro-crystalline silicon film or non-crystalline silicon film may similarly be employed.

Although the present embodiment illustrated an example in which the present invention is implemented in an LCD, the present invention is not limited to such a structure. The present invention provides the same advantages when adopted in an organic EL display device.

According to the above embodiment, the retained voltage can be maintained at a fixed value without any relationship with the voltage applied to the data signal line which is varied every horizontal synchronization period. As a result, a display device capable of displaying a favorable display image without fluctuating luminance can be achieved.

Figure 8:
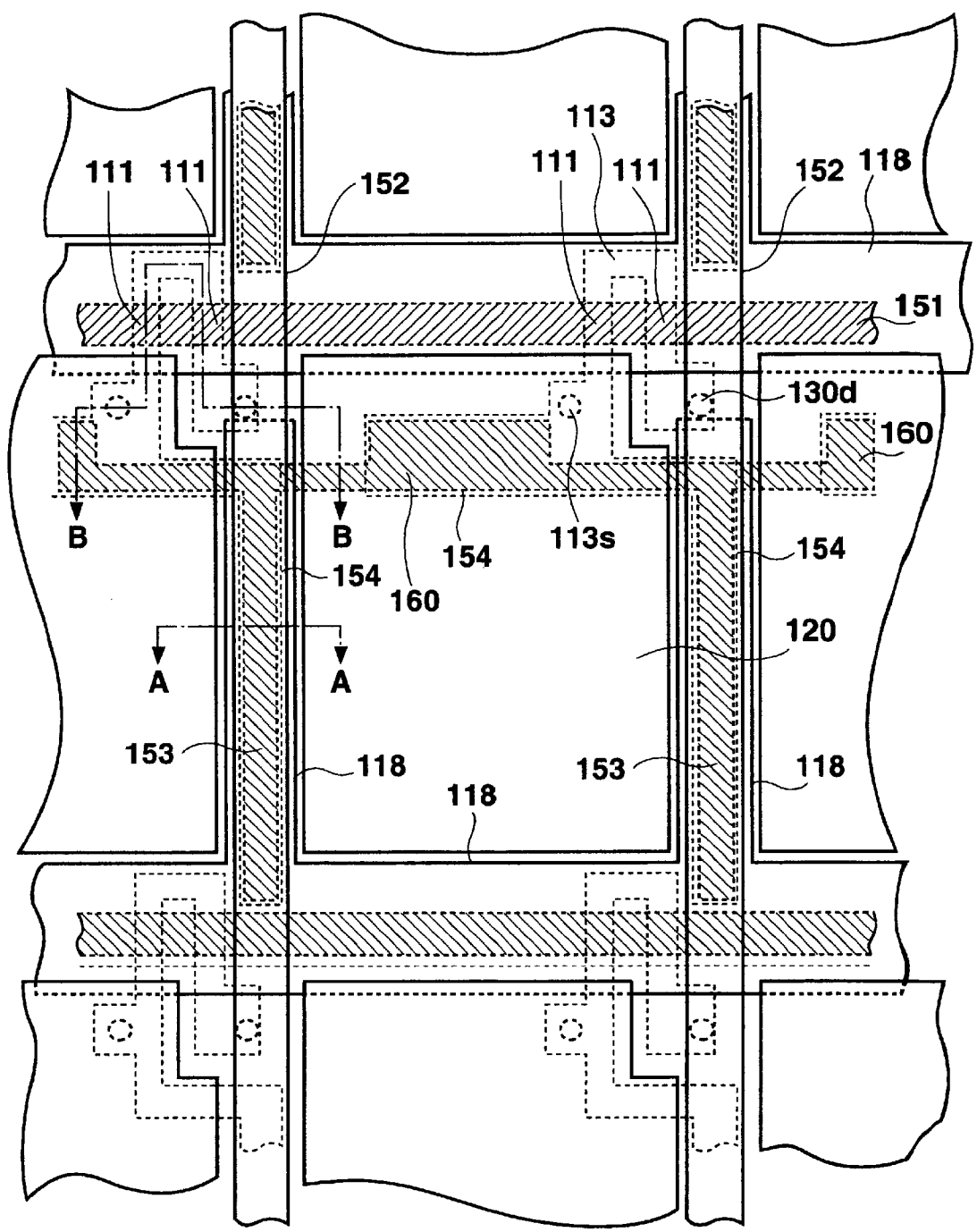
FIG. 8 is a plan view of a display device according to a fourth embodiment of the present invention.
Figure 9A:
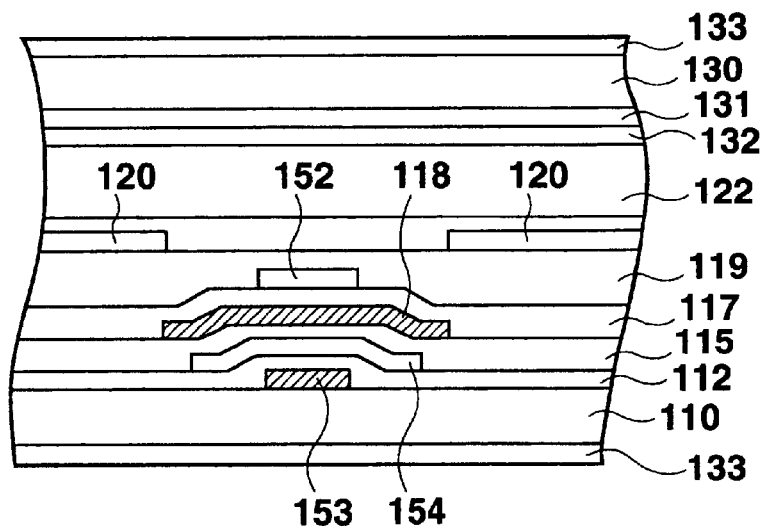
FIGS. 9A and 9B are cross-sectional views of the display device according to the third embodiment of the present invention.

A fourth embodiment is next described. This embodiment is also an example in which the present invention is implemented in an LCD. FIG. 8 is a plan view showing one pixel of an LCD. FIG. 9A shows a cross-sectional view taken along line A—A in FIG. 8, while FIG. 9B illustrates a cross-sectional view taken along line B—B in FIG. 8.

In this embodiment, the shielding film 118 is formed over the first interlayer insulating film 115 covering the capacitor electrode 154. The second interlayer insulating film 117 is disposed over the shielding film 118. The data signal line 152 made of a conductive material such as Al is subsequently provided.

Figure 9B:
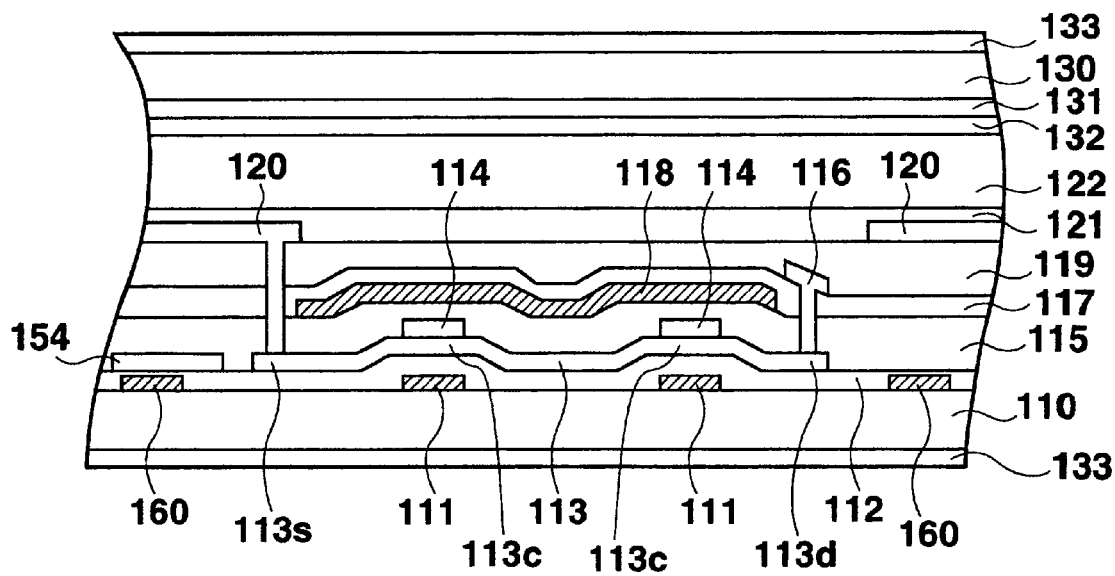

Specifically, as shown in FIGS. 9A and 9B, the shielding film 118 is formed on the interlayer insulating film 115. The shielding film 118 is composed of a non-transparent material such as Cr, Mo, or titanium (Ti). Further on top, the interlayer insulating film 117 serving as the third insulating film is formed on the entire surface by sequential lamination of a $SiO_2$ film, a SiN film, and a $SiO_2$ film, for example.

In the above structure, the shielding film 118 is formed so as to cover the channels 113c of the TFT in the TFT region, and in addition, to cover the capacitor electrode 154 that creates capacitance with the storage capacitor electrode protruding portion 153 in the region forming the storage capacitor.

According to such an arrangement, while eliminating light leakage from regions around the pixel electrode 120, generation of capacitance coupling between the capacitor electrode 154 made of p-Si and the data signal line 152s is prevented. The influence of the voltage applied to the data signal line 152 on the capacitor electrode 154 is thereby suppressed, and the retained voltage is not affected.

In this way, altering of the voltage applied to the pixel electrode 120 due to the influence of the voltage applied to the data signal line 152, which is varied every horizontal synchronization period, is prevented. Accordingly, the conventional problem of a washed out display screen and resulting decreased contrast can be eliminated.

While p-Si film was used as the semiconductor film of the active layer in the above-described embodiments, microcrystalline silicon film or non-crystalline silicon film may similarly be employed.

Although the present embodiment illustrated an example in which the present invention is implemented in an LCD, the present invention is not limited to such a structure. The present invention provides the same advantages when adopted in an organic EL display device.

According to the fourth embodiment, the retained voltage can be maintained at a fixed value without any relationship with the voltage applied to the data signal line which is varied for every horizontal synchronization period. As a result, a display device capable of displaying a favorable display image without fluctuating luminance can be achieved.

What is claimed is:

1. An active matrix display device in which display in each pixel is controlled by switching a transistor disposed in each pixel, comprising:
    a plurality of gate lines arranged in a column direction;
    a plurality of data lines arranged in a row direction;
    pixel electrodes arranged in a matrix corresponding to each intersection of said gate lines and said data lines;
    a first storage capacitor electrode connected to said pixel electrode;
    a second storage capacitor electrode extended in a direction parallel to said gate lines, said second storage capacitor electrode opposing said first storage capacitor electrode beyond an insulating film, and forming a storage capacitor in said opposed portion; wherein
        portions of said first and second storage capacitor electrodes protrude along said data line in a direction parallel to said data lines; and
        at least a part of a protruding portion of said first storage capacitor electrode and a part of a protruding portion of said second storage capacitor electrode are overlapped.

2. The device defined in claim 1, wherein said second storage capacitor electrode is composed of a non-transparent material.

3. The device defined in claim 2, wherein said second storage capacitor electrode is composed of a metal.

4. The device defined in claim 1, wherein a portion of said protruding portion of said second storage capacitor electrode is arranged so as to overlap said data line.

5. The device defined in claim 4, wherein said protruding portion of said first storage capacitor electrode is arranged so as not to overlap said data line.

6. The device defined in claim 5, wherein
    said first storage capacitor electrode is a semiconductor film; and
    a portion of said semiconductor film which opposes said gate line beyond an insulating film constitutes a channel region of said transistor.

7. The device defined in claim 2, wherein
    a light-shielding portion formed by widening said data line is disposed in a region between an end of said protruding portion of said second storage capacitor electrode and said gate line of an adjacent row; and
    said light-shielding portion partially overlaps said gate line and said second storage capacitor electrode.

8. The device defined in claim 2, further comprising:
    a light-shielding film covering a region between said data line and said pixel electrode; wherein said light-shielding film is positioned along a side of said data line in which said protruding portion of said second storage capacitor electrode is absent, and is absent along a side of said data line in which said protruding portion of said second storage capacitor electrode is present.

9. The device defined in claim 8, wherein said light-shielding film is disposed on a second substrate which opposes a first substrate beyond a liquid crystal layer, said first substrate being provided with said gate lines, said data lines, and said storage capacitor.

10. The device defined in claim 1, wherein said first storage capacitor electrode is a semiconductor film; and a portion of said semiconductor film which opposes said gate line beyond an insulating film constitutes a channel region of said transistor.

11. The device defined in claim 1, wherein said protruding portion of said first storage capacitor electrode is arranged so as to avoid forming an overlap with said data line in a plan view.

12. The device defined in claim 11, wherein said first storage capacitor electrode is a semiconductor film; and a portion of said semiconductor film which opposes said gate line beyond an insulating film constitutes a channel region of said transistor.

13. The device defined in claim 1, wherein said first storage capacitor electrode overlaps said data line in a plan view; and a shielding film is provided in an interlayer between a semiconductor film and said data line.

14. The device defined in claim 13, wherein said shielding film is composed of a non-transparent material.

15. The device defined in claim 14, wherein said shielding film is composed of a metal.

16. The device defined in claim 13, wherein an insulating film is formed between said shielding film and said data line, and between said shielding film and said semiconductor film.

17. The device defined in claim 13, wherein said first storage capacitor electrode is a semiconductor film; and a portion of said semiconductor film which opposes said gate line beyond an insulating film constitutes a channel region of said transistor.

18. The device defined in claim 1, wherein said protruding portion of said first storage capacitor electrode and a part of said protruding portion of said second storage capacitor electrode extend in the same direction.

* * * * *